US012570315B2

(12) United States Patent
Fujimura et al.

(10) Patent No.: US 12,570,315 B2
(45) Date of Patent: Mar. 10, 2026

(54) MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventors: Kotaro Fujimura, Wako (JP); Atsushi Kato, Wako (JP); Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 505 days.

(21) Appl. No.: 18/103,585

(22) Filed: Jan. 31, 2023

(65) Prior Publication Data

US 2023/0242150 A1 Aug. 3, 2023

(30) Foreign Application Priority Data

Feb. 1, 2022 (JP) ................................. 2022-014159

(51) Int. Cl.
*B60W 60/00* (2020.01)
*B60W 30/09* (2012.01)
(Continued)

(52) U.S. Cl.
CPC ........ *B60W 60/0011* (2020.02); *B60W 30/09* (2013.01); *B60W 30/0956* (2013.01);
(Continued)

(58) Field of Classification Search
CPC ............ B60W 60/0011; B60W 30/09; B60W 30/0956; B60W 50/0097;
(Continued)

(56) References Cited

U.S. PATENT DOCUMENTS 11,433,885 B1 * 9/2022 Beller ................. B60W 30/095
2017/0113683 A1 * 4/2017 Mudalige .......... B60W 30/0956
(Continued)

FOREIGN PATENT DOCUMENTS

CN      110121449      8/2019
CN      110650877      1/2020
(Continued)

OTHER PUBLICATIONS

Translation and original JP-2011118609-A (Year: 2011).*
(Continued)

*Primary Examiner* — Frederick M Brushaber
(74) *Attorney, Agent, or Firm* — Amin, Turocy & Watson, LLP

(57) ABSTRACT

A mobile object control device includes a storage medium storing computer-readable instructions and a processor connected to the storage medium. The processor executes the computer-readable instructions to recognize a surrounding situation of a mobile object, set a risk area to be avoided in
(Continued)

a traveling process of the mobile object in a plurality of distance-specific areas centered on the mobile object on the basis of the recognized surrounding situation, generate a target trajectory indicating a route along which the mobile object is to travel in the future on the basis of the set risk area, and cause the mobile object to travel along the generated target trajectory. The processor sets different types of risk areas in accordance with the plurality of distance-specific areas.

10 Claims, 9 Drawing Sheets

(51) Int. Cl.
*B60W 30/095* (2012.01)
*B60W 50/00* (2006.01)

(52) U.S. Cl.
CPC ... *B60W 50/0097* (2013.01); *B60W 2554/402* (2020.02); *B60W 2554/80* (2020.02)

(58) Field of Classification Search
CPC ........ B60W 2554/402; B60W 2554/80; G05D 1/0212; G05D 1/0246; G05D 1/0257
See application file for complete search history.

(56) References Cited

U.S. PATENT DOCUMENTS

| | | | | |
|---|---|---|---|---|
| 2019/0176829 | A1* | 6/2019 | Luders | .............. B60W 60/0015 |
| 2019/0213886 | A1* | 7/2019 | Noda | ........................ G08G 1/16 |
| 2019/0329766 | A1 | 10/2019 | Ishioka | |
| 2020/0180618 | A1 | 6/2020 | Ohmura | |
| 2023/0012853 | A1* | 1/2023 | Tam | .................. B60W 30/0953 |

FOREIGN PATENT DOCUMENTS

| | | | |
|---|---|---|---|
| CN | 112703144 | | 4/2021 |
| EP | 4261092 | | 10/2023 |
| JP | 2011-118609 | | 6/2011 |
| JP | 2011118609 | A * | 6/2011 |
| JP | 2018-197048 | | 12/2018 |
| JP | 2021-505458 | | 2/2021 |

OTHER PUBLICATIONS

Japanese Office Action for Japanese Patent Application No. 2022-014159 mailed Jun. 17, 2025.
Chinese Office Action for Chinese Patent Application No. 202310091454.3 mailed Aug. 15, 2025.

* cited by examiner

FIG. 4

| DISTANCE-SPECIFIC AREA | TYPE OF TARGET TO BE SET AS RISK AREA | ROLE |
|---|---|---|
| FIRST DISTANCE-SPECIFIC AREA | ANY TYPE OF TARGET | AVOIDANCE OF ANY COLLISION RISK |
| SECOND DISTANCE-SPECIFIC AREA | TARGET OTHER THAN ROAD MARKING | AVOIDANCE OF SECONDARY COLLISION RISK |
| THIRD DISTANCE-SPECIFIC AREA | TARGET OTHER THAN ROAD MARKING AND SIDEWALL OF LANE | AVOIDANCE OF COLLISION RISK WITH TIME TO SPARE IN ADVANCE |

MOBILE OBJECT CONTROL DEVICE, MOBILE OBJECT CONTROL METHOD, AND STORAGE MEDIUM

CROSS-REFERENCE TO RELATED APPLICATION

Priority is claimed on Japanese Patent Application No. 2022-014159, filed Feb. 1, 2022, the content of which is incorporated herein by reference.

BACKGROUND

Field of the Invention

The present invention relates to a mobile object control device, a mobile object control method, and a storage medium.

Description of Related Art

In the related art, technology for identifying an obstacle located in a traveling direction of a mobile object and controlling the traveling of the mobile object so that the identified obstacle is avoided is known. For example, Japanese Unexamined Patent Application, First Publication No. 2018-197048 discloses that different costs are set in areas near a host vehicle on the basis of information of an image captured by a camera mounted in the host vehicle and a target trajectory of the host vehicle is generated so that the cost is small.

In the technology described in Japanese Unexamined Patent Application, First Publication No. 2018-197048, the cost for any obstacle shown in the image information is set and used to generate the target trajectory of the host vehicle. However, according to a distance from the mobile object or a situation of the mobile object, it may be inefficient to generate a target trajectory in consideration of information of any target located near the mobile object all the more.

SUMMARY

The present invention has been made in consideration of such circumstances and an objective of the present invention is to provide a mobile object control device, a mobile object control method, and a storage medium capable of more efficiently utilizing information of a target located near a mobile object.

A mobile object control device, a mobile object control method, and a storage medium according to the present invention adopt the following configurations.

(1): According to an aspect of the present invention, there is provided a mobile object control device including: a storage medium storing computer-readable instructions; and a processor connected to the storage medium, wherein the processor executes the computer-readable instructions to: recognize a surrounding situation of a mobile object, set a risk area to be avoided in a traveling process of the mobile object in a plurality of distance-specific areas centered on the mobile object on the basis of the recognized surrounding situation, generate a target trajectory indicating a route along which the mobile object is to travel in the future on the basis of the set risk area, and cause the mobile object to travel along the generated target trajectory, and wherein the processor sets different types of risk areas in accordance with the plurality of distance-specific areas.

(2): In the above-described aspect (1), the plurality of distance-specific areas include a first distance-specific area having a range in which a distance from the mobile object is less than or equal to a first threshold value, a second distance-specific area having a range in which the distance from the mobile object is greater than the first threshold value and less than or equal to a second threshold value, and a third distance-specific area having a range in which the distance from the mobile object is greater than the second threshold value and less than or equal to a third threshold value.

(3): In the above-described aspect (2), the processor sets any types of targets located in the first distance-specific area as the plurality of risk areas, sets a target located in the second distance-specific area and having a possibility of a collision when the target trajectory is corrected, and sets a target that is located in the third distance-specific area and is a target other than a traveling path boundary and a sidewall of a lane where the mobile object travels.

(4): In the above-described aspect (3), the processor excludes the traveling path boundary from the plurality of risk areas when a driving operation element of the mobile object has been steered.

(5): In the above-described aspect (2), the processor calculates risk values at trajectory points constituting the target trajectory on the basis of the risk area and generates the target trajectory so that a sum of the calculated risk values is less than or equal to a threshold value.

(6): In the above-described aspect (5), the processor generates each of a first target trajectory in the first distance-specific area, a second target trajectory in the second distance-specific area, and a third target trajectory in the third distance-specific area according to an arc model including trajectory points at which the sum of the risk values is less than or equal to the threshold value and generates the target trajectory by connecting the first target trajectory, the second target trajectory, and the third target trajectory that have been generated.

(7): In the above-described aspect (2), the processor calculates risk values at trajectory points constituting the target trajectory on the basis of the risk area and generates the target trajectory so that a sum of the calculated risk values is minimized.

(8): In the above-described aspect (7), the processor generates each of a first target trajectory in the first distance-specific area, a second target trajectory in the second distance-specific area, and a third target trajectory in the third distance-specific area according to an arc model including trajectory points at which the sum of the risk values is minimized and generates the target trajectory by connecting the first target trajectory, the second target trajectory, and the third target trajectory that have been generated.

(9): According to an aspect of the present invention, there is provided a mobile object control method including: recognizing, by a computer, a surrounding situation of a mobile object: setting, by the computer, a risk area to be avoided in a traveling process of the mobile object in a plurality of distance-specific areas centered on the mobile object on the basis of the recognized surrounding situation: generating, by the computer, a target trajectory indicating a route along which the mobile object is to travel in the future on the basis of the set risk area; causing, by the computer, the mobile object to travel along the generated target trajectory; and setting, by the computer, different types of risk areas in accordance with the plurality of distance-specific areas.

(10): According to an aspect of the present invention, there is provided a storage medium storing a program for causing a computer to: recognize a surrounding situation of a mobile object, set a risk area to be avoided in a traveling process of the mobile object in a plurality of distance-specific areas centered on the mobile object on the basis of the recognized surrounding situation, generate a target trajectory indicating a route along which the mobile object is to travel in the future on the basis of the set risk area, cause the mobile object to travel along the generated target trajectory, and set different types of risk areas in accordance with the plurality of distance-specific areas.

According to the aspects (1) to (10), it is possible to generate a target trajectory by setting a different type of target as a risk area in accordance with a distance from a mobile object and more efficiently utilizing information of a target located near the mobile object.

BRIEF DESCRIPTION OF THE DRAWINGS

FIG. 4 is a diagram showing a relationship between a distance-specific area and a type of target set as a risk area.

DESCRIPTION OF EMBODIMENTS

Hereinafter, embodiments of a mobile object control device, a mobile object control method, and a storage medium of the present invention will be described with reference to the drawings. The mobile object in the present invention is a four-wheeled vehicle, a two-wheeled vehicle, a micro-mobility, a robot, or the like. In the following description, it is assumed that the mobile object is a four-wheeled vehicle.

[Overall Configuration]

Figure 1:
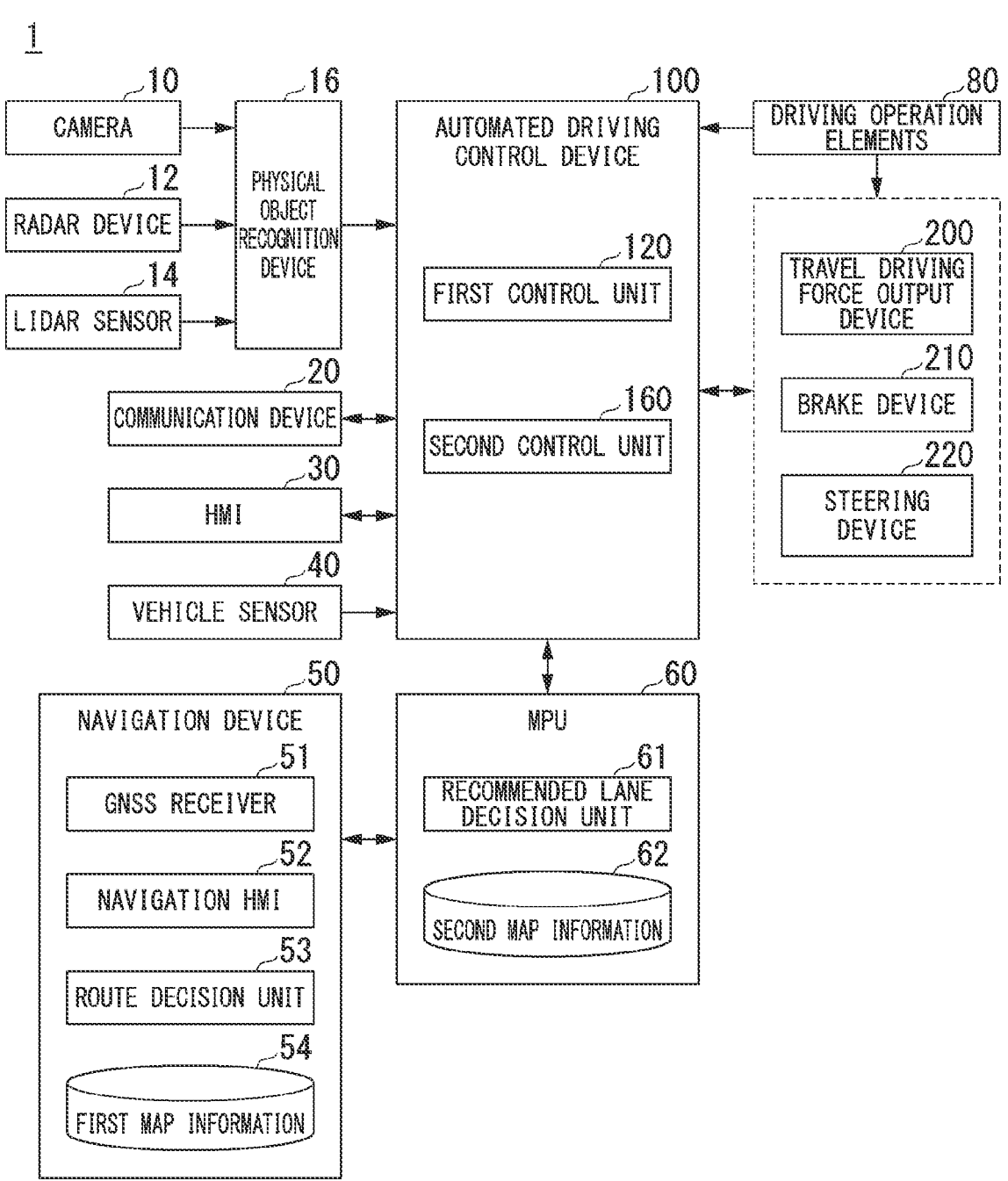
FIG. 1 is a configuration diagram of a vehicle system using a mobile object control device according to the present embodiment.

FIG. 1 is a configuration diagram of a vehicle system 1 using the mobile object control device according to the present embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generation unit connected to the internal combustion engine or electric power that is supplied when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, driving operation elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added.

For example, the camera 10 is a digital camera using a solid-state imaging element such as a charge coupled device (CCD) or a complementary metal oxide semiconductor (CMOS). The camera 10 is attached to any location on the vehicle (hereinafter, a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and speed of the physical object in a frequency modulated continuous wave (FM-CW) scheme.

The LIDAR sensor 14 radiates light (or electromagnetic waves of a wavelength close to an optical wavelength) to the vicinity of the host vehicle M and measures scattered light. The LIDAR sensor 14 detects a distance to an object on the basis of a time period from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are.

The communication device 20 communicates with another vehicle in the vicinity of the host vehicle M using, for example, a cellular network, a Wi-Fi network, Bluetooth (registered trademark), dedicated short range communication (DSRC), or the like, or communicates with various types of server devices via a radio base station.

The HMI 30 provides an occupant of the host vehicle M with various types of information and receives an input operation from the occupant. The HMI 30 includes various types of display devices, a speaker, a buzzer, a touch panel, a switch, a key, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route decision unit 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decision unit 53 decides on a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 based on the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decision unit 61 and stores second map information 62 in a storage device such as an HDD or a flash memory. The recommended lane decision unit 61 divides the route on the map provided from the navigation device 50 into a plurality of blocks (for example, divides the route every 100 [m] in a traveling direction of the vehicle), and decides on a recommended lane for each block with reference to the second map information 62. The recommended lane decision unit 61 decides in what lane numbered from the left the vehicle will travel. The recommended lane decision unit 61 decides on the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, and the like. The second map information 62 may be updated at any time when the communication device 20 communicates with another device.

The driving operation elements 80 include, for example, an accelerator pedal, a brake pedal, a shift lever, a steering wheel, a variant steering wheel, a joystick, and other operation elements. A sensor for detecting an amount of operation or the presence or absence of an operation is attached to the driving operation element 80 and a detection result is output to the automated driving control device 100 or some or all of the travel driving force output device 200, the brake device 210, and the steering device 220.

The automated driving control device 100 includes, for example, a first control unit 120 and a second control unit 160. Each of the first control unit 120 and the second control unit 160 is implemented, for example, by a hardware processor such as a central processing unit (CPU) executing a program (software). Some or all of the above components may be implemented by hardware (including a circuit: circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device.

Figure 2:
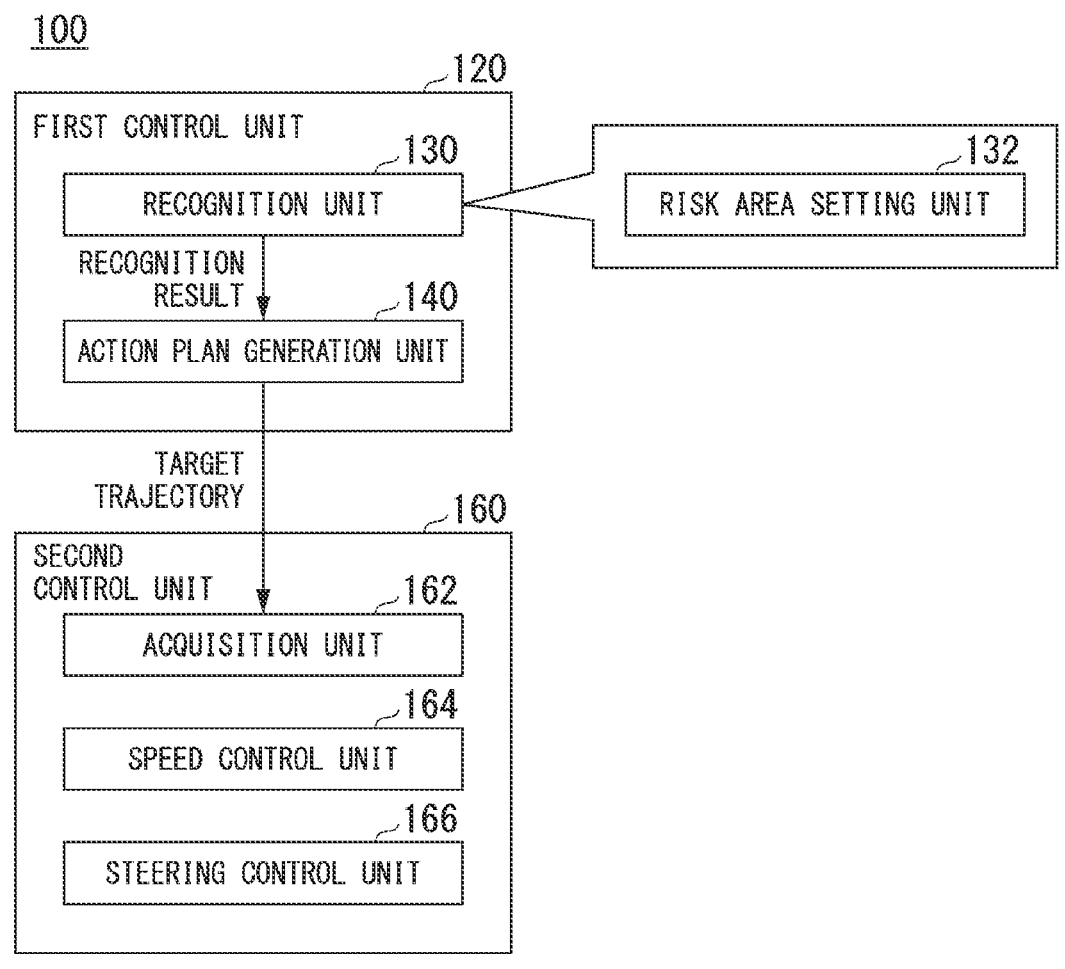
FIG. 2 is a functional configuration diagram of a first control unit and a second control unit.

FIG. 2 is a functional configuration diagram of the first control unit 120 and the second control unit 160. The first control unit 120 includes, for example, a recognition unit 130 and the action plan generation unit 140. For example, the first control unit 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is secured.

The recognition unit 130 recognizes states of positions, speeds, acceleration, and the like of physical objects near the host vehicle M on the basis of information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented area. The "state" of a physical object may include acceleration or jerk of the physical object or an "action state" (for example, whether or not a lane change is being made or intended).

Also, for example, the recognition unit 130 recognizes a lane in which the host vehicle M is traveling (a traveling lane). For example, the recognition unit 130 recognizes the traveling lane by comparing a pattern of road markings (for example, an arrangement of solid lines and broken lines) obtained from the second map information 62 with a pattern of road markings in the vicinity of the host vehicle M recognized from an image captured by the camera 10. Also, the recognition unit 130 may recognize the traveling lane by recognizing a traveling path boundary (a road boundary) including a road marking, a road shoulder, a curb, a median strip, a guardrail, or the like as well as a road marking. In this recognition, a position of the host vehicle M acquired from the navigation device 50 or a processing result of the INS may be taken into account. Also, the recognition unit 130 recognizes a temporary stop line, an obstacle, red traffic light, a toll gate, and other road events.

Furthermore, when the traveling lane is recognized, the recognition unit 130 recognizes a position or an orientation of the host vehicle M with respect to the traveling lane. For example, the recognition unit 130 may recognize a gap of a reference point of the host vehicle M from the center of the lane and an angle formed with respect to a line connected to the center of the lane in the traveling direction of the host vehicle M as a relative position and orientation of the host vehicle M related to the traveling lane. Alternatively, the recognition unit 130 may recognize a position of the reference point of the host vehicle M related to one side end portion (a road marking or a road boundary) of the traveling lane or the like as a relative position of the host vehicle M related to the traveling lane. Although the recognition unit 130 includes a risk area setting unit 132 in the present embodiment, details of a function of the risk area setting unit 132 will be described below.

The action plan generation unit 140 generates a future target trajectory along which the host vehicle M will automatically travel (independently of the driver's operation) so that the host vehicle M can generally travel in the recommended lane determined by the recommended lane decision unit 61 and further cope with a surrounding situation of the host vehicle M. For example, the target trajectory includes a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the host vehicle M is required to arrive at the sampling time for each prescribed sampling time. In this case, information of the target speed or the target acceleration is represented by an interval between the trajectory points.

The action plan generation unit 140 may set an automated driving event when a target trajectory is generated. Automated driving events include a constant-speed traveling event, a low-speed tracking traveling event, a lane change event, a branching-point-related movement event, a merging-point-related movement event, a takeover event, and the like. The action plan generation unit 140 generates a target trajectory according to an activated event.

The second control unit 160 controls the travel driving force output device 200, the brake device 210, and the steering device 220 so that the host vehicle M passes along the target trajectory generated by the action plan generation unit 140 at the scheduled times.

Returning to FIG. 2, the second control unit 160 includes, for example, an acquisition unit 162, a speed control unit 164, and a steering control unit 166. The acquisition unit 162 acquires information of a target trajectory (trajectory points) generated by the action plan generation unit 140 and causes a memory (not shown) to store the information. The speed control unit 164 controls the travel driving force output device 200 or the brake device 210 on the basis of a speed element associated with the target trajectory stored in the memory. The steering control unit 166 controls the steering device 220 in accordance with a degree of curvature of the target trajectory stored in the memory. The processes of the speed control unit 164 and the steering control unit 166 are implemented by, for example, a combination of feedforward control and feedback control. As an example, the steering control unit 166 executes feedforward control according to the curvature of the road in front of the host vehicle M and feedback control based on deviation from the target trajectory in combination.

The travel driving force output device 200 outputs a travel driving force (torque) for enabling the host vehicle M to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second control unit 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second control unit 160 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. The brake device 210 is not limited to the above-described configuration and may be an electronically controlled hydraulic brake device configured to control an actuator in accordance with information input from the second control unit 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second control unit 160 or the information input from the driving operation element 80 to change the direction of the steerable wheels.

[Operations]

Figure 3:
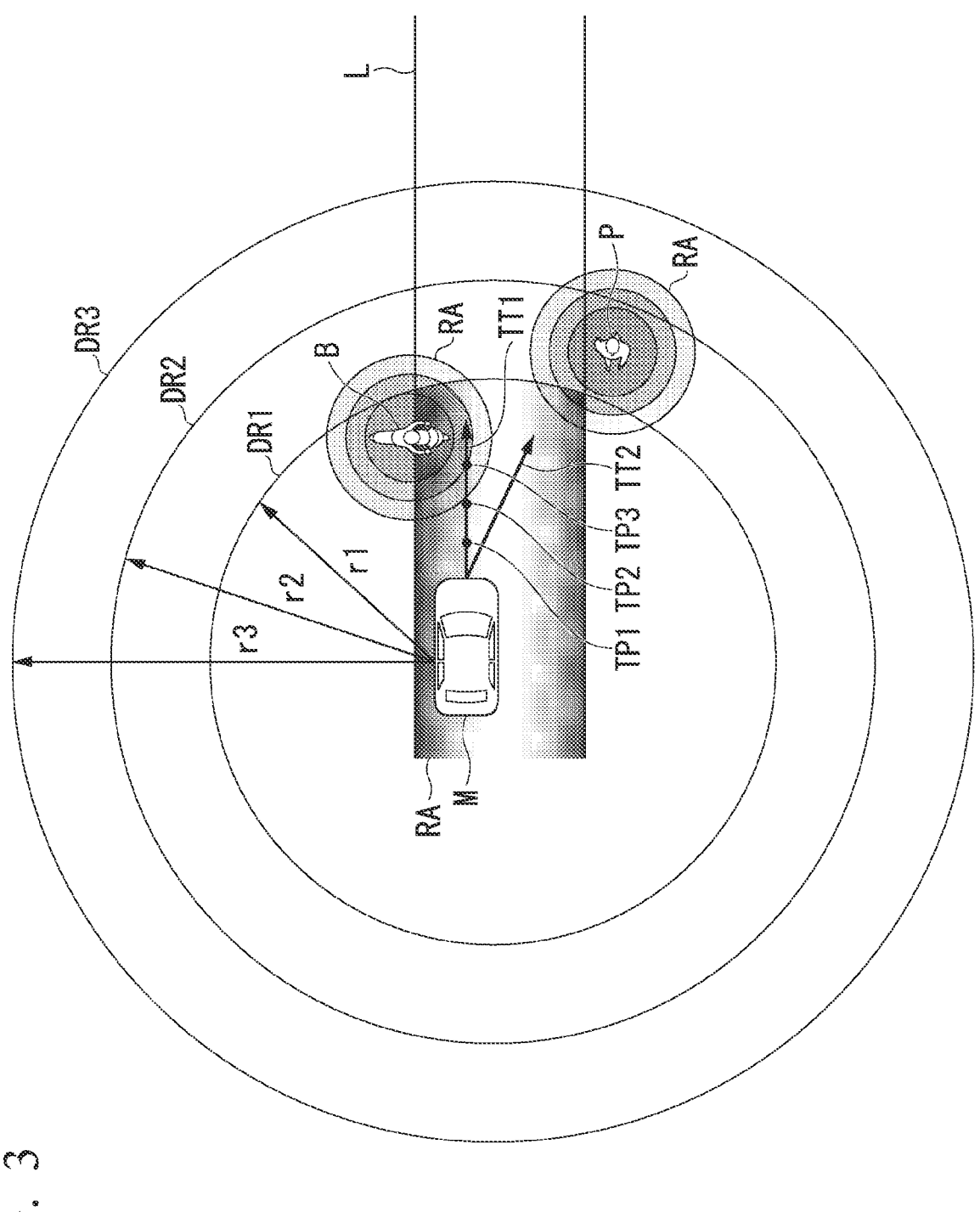
FIG. 3 is a diagram for describing an overview of a process executed by a risk area setting unit.

Next, a process executed by the risk area setting unit 132 will be described. FIG. 3 is a diagram for describing an overview of the process executed by the risk area setting unit 132. In FIG. 3, reference sign DR1 denotes a first distance-specific area within a radius r1 centered on the host vehicle M, reference sign DR2 denotes a second distance-specific area larger than the radius r1 and within a radius r2 centered on the host vehicle M, reference sign DR3 indicates a third distance-specific area larger than the radius r2 and within a radius r3 centered on the host vehicle M, reference sign B denotes a motorcycle that is a traffic participant, reference sign RA denotes a risk area set by the risk area setting unit 132, reference sign P denotes a pedestrian who is a traffic participant, and reference sign L denotes a road marking (a traveling path boundary). FIG. 3 shows a scene in which the host vehicle M is traveling along a target trajectory TT1 generated by the action plan generation unit 140 as an example. The radius r1 of the first distance-specific area DR1 is an example of a "first threshold value," the radius r2 of the second distance-specific area DR2 is an example of a "second threshold value," and the radius r3 of the third distance-specific area DR3 is an example of a "third threshold value."

The risk area setting unit 132 sets a risk area RA to be avoided in a traveling process of the host vehicle M with respect to each of a plurality of distance-specific areas DR centered on the host vehicle M (i.e., the first distance-specific area DR1, the second distance-specific area DR2, and the third distance-specific area DR3 in the present embodiment) on the basis of a surrounding situation of the host vehicle M recognized by the recognition unit 130. More specifically, the risk area setting unit 132 identifies a different type of target for each distance-specific area and sets the risk area as the risk area RA by setting the risk value R as a larger value (i.e., an unfavorable value) when the host vehicle M is closer to the identified target in an area near the target. In the case of FIG. 3, the risk area setting unit 132 sets the motorcycle B and the road marking L as the risk areas RA in the first distance-specific area DR1. In the risk area RA, a dark-colored portion represents a large risk value and a light-colored portion represents a small risk value.

FIG. 4 is a diagram showing a relationship between the distance-specific area and the type of target set as the risk area. As shown in FIG. 4, the risk area setting unit 132 sets, as the risk area, any type of target located in the first distance-specific area DR1, a target that is located in the second distance-specific area DR2 and is a target other than the road marking L, and a target that is located in the third distance-specific area DR3 and is a target other than the road marking L and a sidewall of a lane where the host vehicle M travels. That is, the first distance-specific area DR1 is a risk setting area for avoiding a collision with any target located at a short distance from the host vehicle M, the second distance-specific area DR2 is a risk setting area located at a middle distance from the host vehicle M and configured to avoid a collision with a target having a secondary collision risk, and the third distance-specific area DR3 is a risk setting area for avoiding a collision with a target located at a far distance from the host vehicle M with time to spare in advance. Although a target other than the road marking L is set as a target having the possibility of a secondary collision as an example in FIG. 4, the present invention is not limited to such a configuration. In general, any target may be set by a system administrator as long as the target has the possibility of a secondary collision.

The action plan generation unit 140 calculates risk values for trajectory points constituting the target trajectory and corrects the target trajectory so that the target trajectory is less than the threshold value when a sum of the calculated risk values is greater than or equal to the threshold value. For example, in the case of FIG. 3, the action plan generation unit 140 calculates risk values for trajectory points TP1 and TP2 constituting a target trajectory TT1 and corrects the target trajectory TT1 when the sum of the calculated risk values is greater than or equal to the threshold value. For example, a process of generating a target trajectory TT2 in which trajectory points do not cross the risk area RA (i.e., the risk value is zero) when the target trajectory TT1 is corrected is conceivable.

However, in general, when the target trajectory is corrected and the host vehicle M travels along the corrected target trajectory, a secondary collision with an obstacle located on the corrected target trajectory may occur. For example, in the case of FIG. 3, when the host vehicle M travels along the corrected target trajectory TT2, a secondary collision with a pedestrian P may occur. Using this circumstance as the background, the risk area setting unit 132 according to the present embodiment sets a different type of target as the risk area RA for each distance-specific area and the action plan generation unit 140 generates a target trajectory of the host vehicle M on the basis of the risk area RA set for each distance-specific area, as described with reference to FIG. 4.

Figure 5:
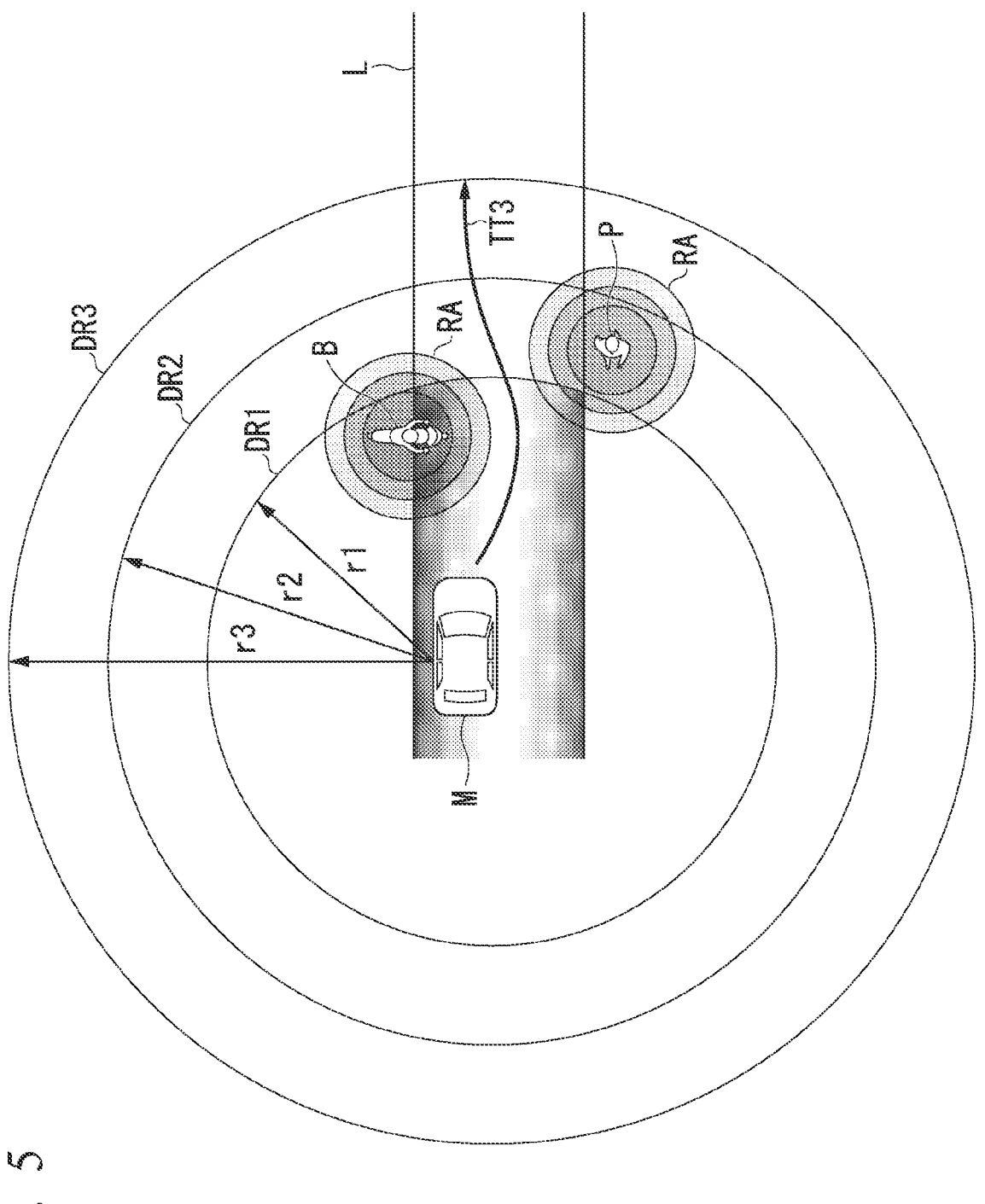
FIG. 5 is a diagram showing an example of a target trajectory corrected by an action plan generation unit in accordance with setting of the risk area.

FIG. 5 is a diagram showing an example of a target trajectory corrected by the action plan generation unit 140 in accordance with setting of the risk area RA. As shown in FIG. 5, the risk area setting unit 132 sets the risk area RA corresponding to a road marking L and a motorcycle B in the first distance-specific area DR1 and sets the risk area RA corresponding to a pedestrian P having the possibility of a secondary collision in the second distance-specific area DR2. Thus, the action plan generation unit 140 corrects a target trajectory by displacing trajectory points so that a sum of risk values of the trajectory points constituting the target trajectory is less than a threshold value on the basis of these set risk areas RA. In the example of FIG. 5, it can be seen that a target trajectory TT3 is generated in the correction process.

Figure 6:
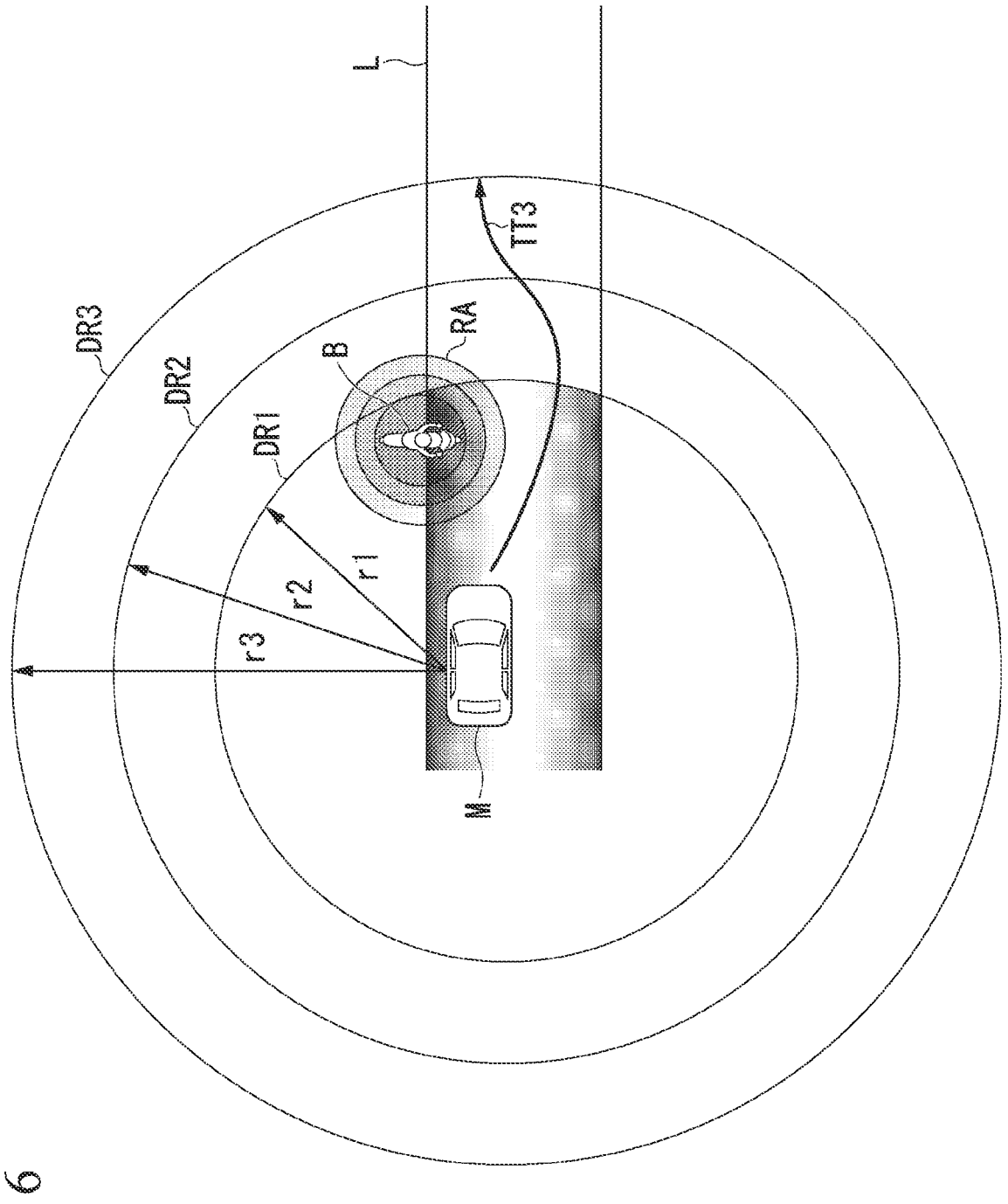
FIG. 6 is a diagram showing another example of the target trajectory corrected by the action plan generation unit according to the setting of the risk area.

FIG. 6 is a diagram showing another example of the target trajectory corrected by the action plan generation unit 140 in accordance with the setting of the risk area RA. Unlike FIG. 5, FIG. 6 shows a case where there is no pedestrian P and the risk area setting unit 132 sets only the risk area RA corresponding to the road marking L and the motorcycle B. In this case, the risk area setting unit 132 does not set a target other than the road marking L in the second distance-specific area DR2 and can avoid the motorcycle B more reliably than in a case where the road marking L is set as the risk area.

Figure 7:
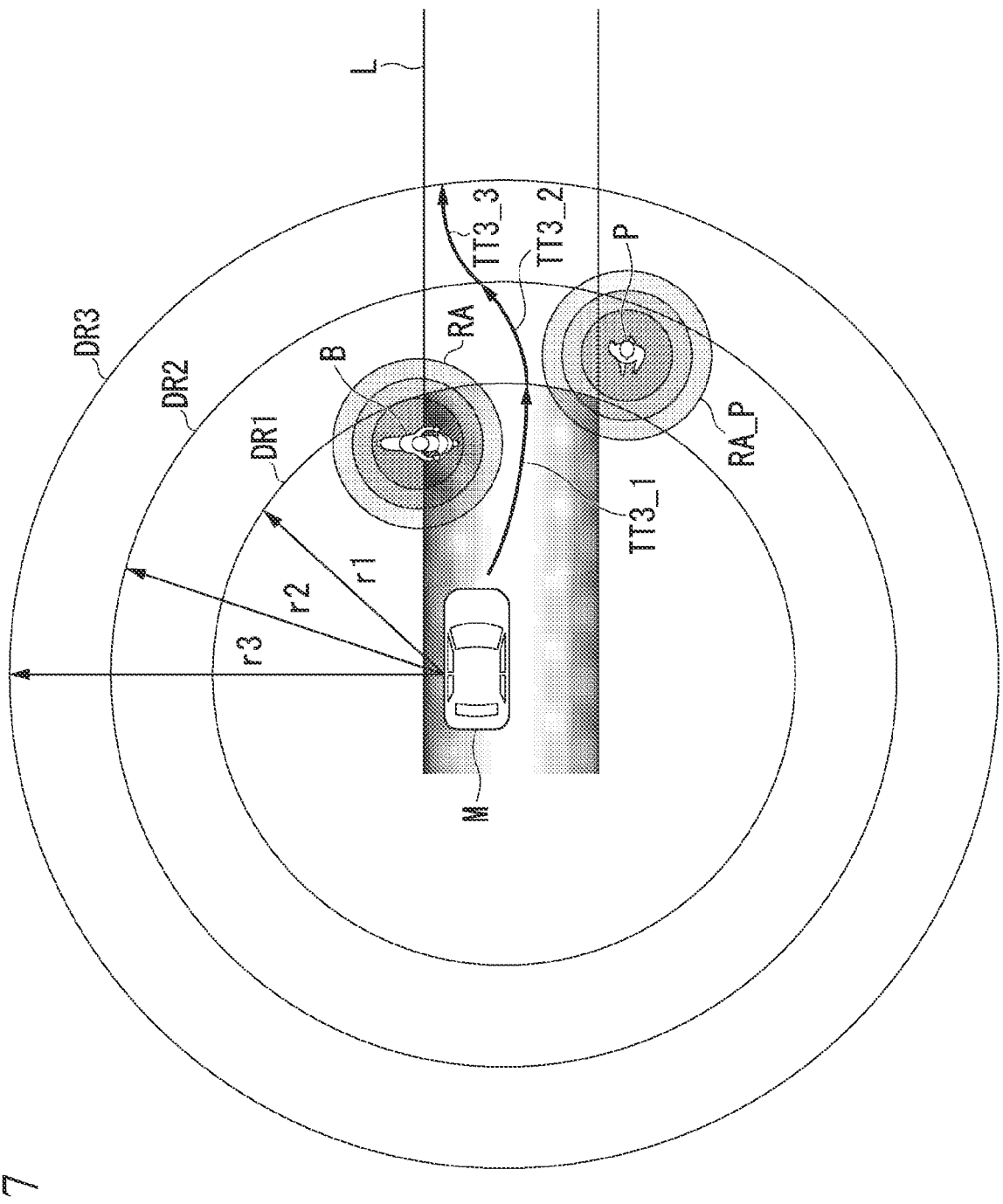
FIG. 7 is a diagram for describing a detailed method in which the action plan generation unit generates a target trajectory.

Next, a detailed method of generating the target trajectory will be described with reference to FIG. 7. FIG. 7 is a diagram for describing a detailed method in which the action plan generation unit 140 generates the target trajectory. In FIG. 7, TT3_1 denotes a partial target trajectory generated for the first distance-specific area DR1, TT3_2 denotes a partial target trajectory generated for the second distance-specific area DR2, and TT3_3 denotes a partial target trajectory generated for the third distance-specific area DR3.

As shown in FIG. 7, the action plan generation unit 140 searches for trajectory points at which the sum of risk values is less than the threshold value using an arc model for each distance-specific area DR and generates the found arc model as a partial target trajectory. For example, the action plan generation unit 140 first changes parameters of the arc model so that the sum of the risk values of the trajectory points is less than the threshold value for the first distance-specific area DR1 and generates an arc model in which the sum of the risk values of the trajectory points is less than the threshold value as the partial target trajectory TT3_1. Next, for the second distance-specific area DR2, the action plan generation unit 140 changes parameters of the arc model so that the end point of the partial target trajectory TT3_1 is designated as a starting point and the sum of the risk values of the trajectory points is less than the threshold value and generates an arc model in which the sum of the risk values of the trajectory points is less than the threshold value as a partial target trajectory TT3_2. Next, for the third distance-specific area DR3, the action plan generation unit 140 changes parameters of the arc model so that the end point of the partial target trajectory TT3_2 is designated as a starting point and the sum of the risk values of the trajectory points is less than the threshold value and generates an arc model in which the sum of the risk values of the trajectory points is less than the threshold value as a partial target trajectory TT3_3.

Figure 8:
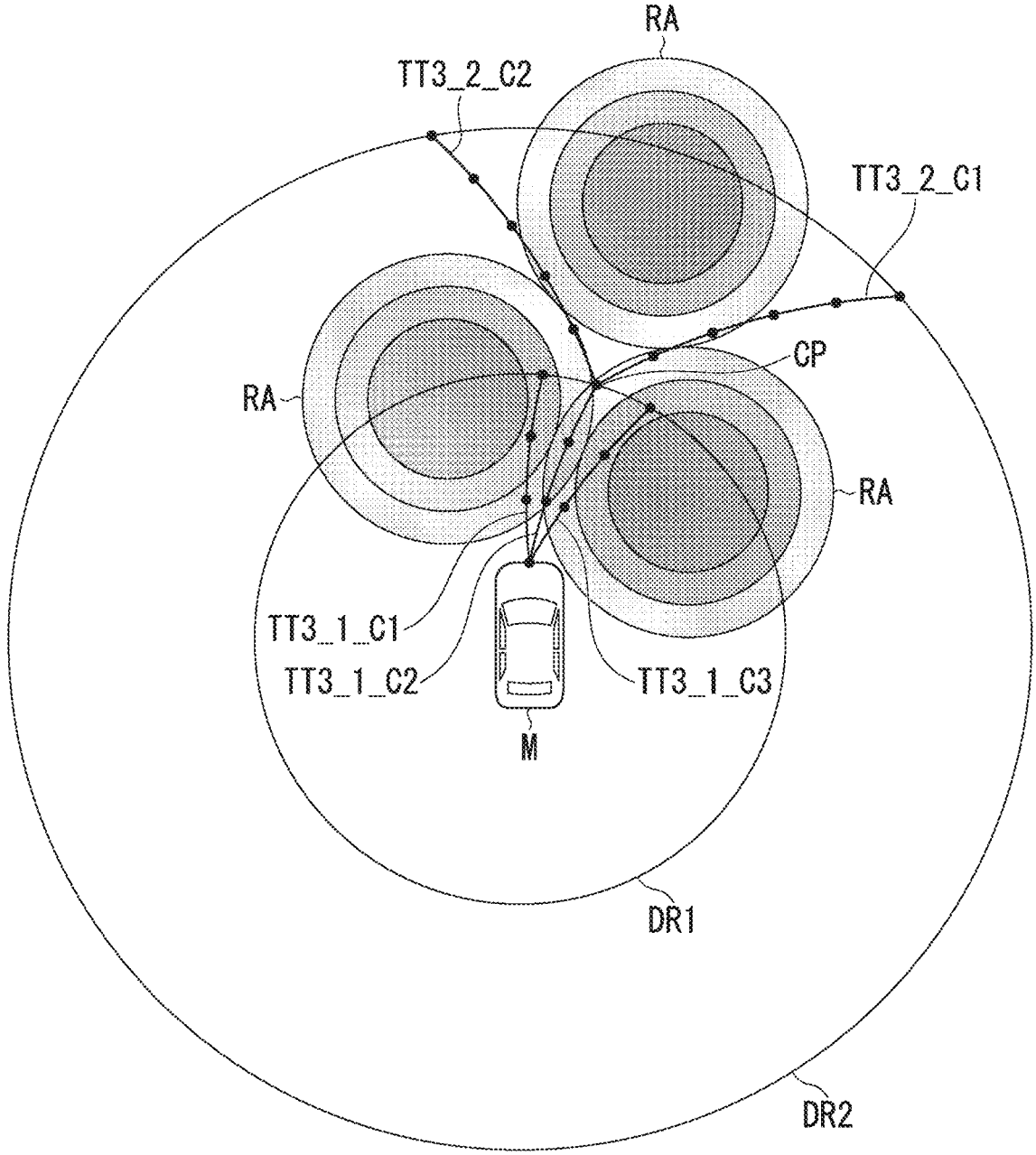
FIG. 8 is a diagram for describing details of a method of searching for a target trajectory using an arc model.

FIG. 8 is a diagram for describing details of the method of searching for the target trajectory using the arc model. In FIG. 8, reference signs TT3_1_C1, TT3_1_C2, and TT3_1_C3 denote arc models serving as candidates for the partial target trajectory TT3_1 (hereinafter collectively referred to as "TT3_1_C") and reference signs TT3_2_C1 and TT3_2_C2 denote arc models serving as candidates for the partial target trajectory TT3_2 (hereinafter collectively referred to as "TT3_2_C"). As shown in FIG. 8, for the first distance-specific area DR1, the action plan generation unit 140 first changes the parameters of the arc model TT3_1_C (for example, an end point and curvature of an arc) on the basis of the position of the host vehicle M (the center of the front end in FIG. 8) and determines the arc model TT3_1_C as the partial target trajectory TT3_1 when the sum of the risk values of the trajectory points located on the arc model TT3_1_C is less than the threshold value. Subsequently, the action plan generation unit 140 changes the parameters of the arc model TT3_2_C so that the determined end point CP of the arc model TT3_1_C is designated as the starting point and the sum of the risk values of the trajectory points is less than the threshold value and determines the arc model TT3_2_C as the partial target trajectory TT3_2 when the sum of the risk values is less than the threshold value. Likewise, the action plan generation unit 140 generates a partial target trajectory TT3_3 in which the determined end point CP of the arc model TT3_1_C is designated as the starting point. The partial target trajectory TT3_1 in the first distance-specific area DR1 generated as described above is referred to as an arc trajectory for avoiding any collision risk, the partial target trajectory TT3_2 in the second distance-specific area DR2 is referred to as an arc trajectory for avoiding a secondary collision risk, and the partial target trajectory TT3_3 in the third distance-specific area DR3 is referred to as an arc trajectory for avoiding a collision with the target with time to spare. Also, at this time, the action plan generation unit 140 may execute the search by the arc model a predetermined number of times without using the threshold value and determine the arc model that minimizes the sum of the risk values of the trajectory points as the partial target trajectory.

The action plan generation unit 140 generates the target trajectory TT3 by interconnecting the generated partial target trajectories TT3_1, TT3_2, and TT3_3. At this time, the action plan generation unit 140 may calculate the sum of the risk values of the generated target trajectory TT3, store target trajectory candidates, and determine a target trajectory candidate having a minimum sum of risk values among a plurality of target trajectory candidates obtained by executing the above-described search and connection process for the partial target trajectory a predetermined number of times as a final target trajectory. Furthermore, the action plan generation unit 140 may obtain the final target trajectory by performing a fitting process using a smooth curve as well as by merely connecting the generated partial target trajectories TT3_1, TT3_2, and TT3_3.

Also, in the above-described embodiment, any type of target is set as the first distance-specific area DR1. However, for example, when the driving operation element 80 has been steered by the occupant of the host vehicle M, the risk area setting unit 132 may exclude the road markings from the risk area RA to be set. This is because, when the driving operation element 80 has been steered by the occupant of the host vehicle M, a situation of high urgency may occur and it may not be a priority to consider the road marking as the risk area RA.

Furthermore, in the above-described embodiment, three distance-specific areas, i.e., the first distance-specific area DR1, the second distance-specific area DR2, and the third distance-specific area DR3, are set as the plurality of distance-specific areas. However, the present invention is not limited to such a configuration. Two distance-specific areas or four or more distance-specific areas may be set and different types of targets may be set as risk areas for each distance-specific area.

Figure 9:
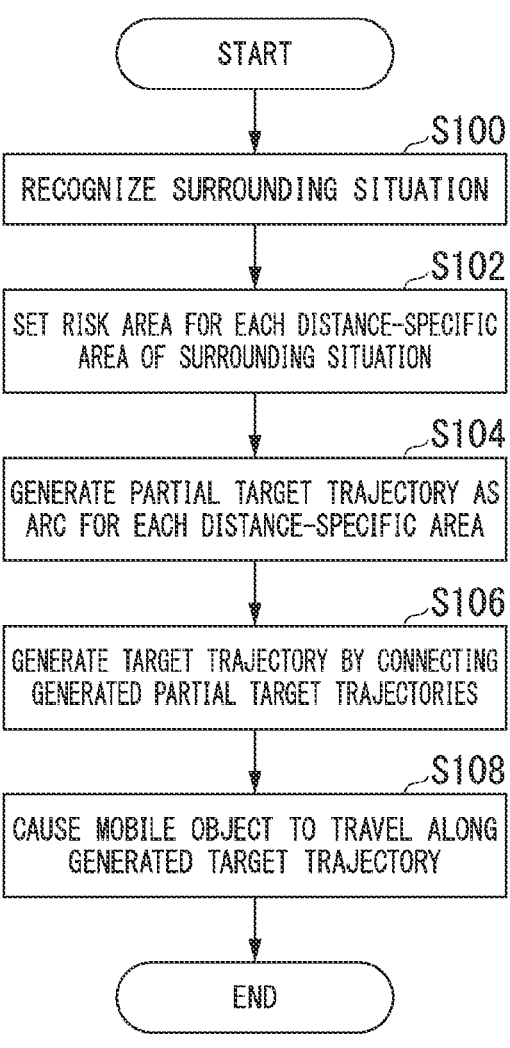
FIG. 9 is a flowchart showing an example of a flow of a process executed by an automated driving control device.

Next, a flow of a process executed by the automated driving control device 100 will be described with reference to FIG. 9. FIG. 9 is a flowchart showing an example of the flow of the process executed by the automated driving control device 100.

First, the recognition unit 130 recognizes a surrounding situation of the host vehicle M on the basis of information input via the physical object recognition device 16 (step S100). Subsequently, the risk area setting unit 132 sets a risk area RA for each distance-specific area of the recognized surrounding situation (step S102).

Subsequently, the action plan generation unit 140 generates a partial target trajectory of the host vehicle M as an arc for each distance-specific area on the basis of the risk area RA set by the risk area setting unit 132 (step S104). More specifically, the action plan generation unit 140 changes parameters of an arc model so that a sum of risk values of trajectory points calculated on the basis of the risk area RA is less than or equal to a threshold value and determines the arc model in which the risk values of the trajectory points is less than or equal to the threshold value as the partial target trajectory.

Subsequently, the action plan generation unit 140 generates a target trajectory by interconnecting generated partial target trajectories (step S106). Subsequently, the second control unit 160 causes the host vehicle M to travel along the generated target trajectory (step S108). Thereby, the process of the present flowchart ends.

According to the present embodiment described above, different types of targets are set as risk areas in accordance with a distance from a host vehicle, a partial target trajectory is generated as an arc for each distance-specific area so that a sum of risk values of trajectory points calculated on the basis of the set risk areas is less than or equal to a threshold value, a target trajectory is generated by connecting generated partial target trajectories, and the host vehicle is allowed to travel along the generated target trajectory. Thereby, it is possible to more efficiently utilize information of a target located near a mobile object.

The above-described embodiment can be represented as follows.

A mobile object control device including:

a storage device storing a program; and a hardware processor, wherein the hardware processor executes the program stored in the storage device to:

recognize a surrounding situation of a mobile object, set a risk area to be avoided in a traveling process of the mobile object in a plurality of distance-specific areas centered on the mobile object on the basis of the recognized surrounding situation, generate a target trajectory indicating a route along which the mobile object is to travel in the future on the basis of the set risk area, cause the mobile object to travel along the generated target trajectory, and set different types of risk areas in accordance with the plurality of distance-specific areas.

Although modes for carrying out the present invention have been described above using embodiments, the present invention is not limited to the embodiments, and various modifications and substitutions can also be made without departing from the scope and spirit of the present invention.

What is claimed is:

1. A mobile object control device comprising:

a storage medium storing computer-readable instructions; and a processor connected to the storage medium, wherein the processor executes the computer-readable instructions to:

recognize a surrounding situation of a mobile object, set a recognized target as a risk area to be avoided in a traveling process of the mobile object in a plurality of distance-specific areas centered on the mobile object on a basis of the recognized surrounding situation, resulting in a set risk area, generate a target trajectory indicating a route along which the mobile object is to travel in the future on a basis of the set risk area, resulting in a generated target trajectory, and cause the mobile object to travel along the generated target trajectory, wherein the processor sets different types of recognized targets as the set risk area in accordance with the plurality of distance-specific areas.

2. The mobile object control device according to claim 1, wherein the plurality of distance-specific areas comprise:

a first distance-specific area comprising a range in which a distance from the mobile object is less than or equal to a first threshold value, a second distance-specific area comprising a range in which the distance from the mobile object is greater than the first threshold value and less than or equal to a second threshold value, and a third distance-specific area comprising a range in which the distance from the mobile object is greater than the second threshold value and less than or equal to a third threshold value.

3. The mobile object control device according to claim 2, wherein the processor sets as the set risk area;

any types of targets located in the first distance-specific area, a target that is located in the second distance-specific area and has a possibility of a collision if the target trajectory is corrected, and a target that is located in the third distance-specific area and comprises a target other than a traveling path boundary and a sidewall of a lane where the mobile object travels.

4. The mobile object control device according to claim 3, wherein the processor excludes the traveling path boundary from the plurality of risk areas when a driving operation element of the mobile object has been steered.

5. The mobile object control device according to claim 2, wherein the processor:

determines risk values at trajectory points constituting the target trajectory on a basis of the risk area; and generates the generated target trajectory so that a sum of the calculated risk values is less than or equal to a threshold value.

6. The mobile object control device according to claim 5, wherein the processor:

generates:

a first target trajectory in the first distance-specific area, a second target trajectory in the second distance-specific area, and a third target trajectory in the third distance-specific area according to an arc model comprising trajectory points at which the sum of the risk values is less than or equal to the threshold value; and generates the generated target trajectory by connecting the first target trajectory, the second target trajectory, and the third target trajectory.

7. The mobile object control device according to claim 2, wherein the processor:

determines risk values at trajectory points constituting the target trajectory on a basis of the risk area; and generates the generated target trajectory so that a sum of the calculated risk values is minimized.

8. The mobile object control device according to claim 7, wherein the processor:

generates:

a first target trajectory in the first distance-specific area, a second target trajectory in the second distance-specific area, and a third target trajectory in the third distance-specific area according to an arc model including trajectory points at which the sum of the risk values is minimized; and generates the generated target trajectory by connecting the first target trajectory, the second target trajectory, and the third target trajectory.

9. A mobile object control method comprising:

recognizing, by a computer, a surrounding situation of a mobile object, resulting in a recognized surrounding situation;

setting, by the computer, a recognized target as a risk area to be avoided in a traveling process of the mobile object in a plurality of distance-specific areas centered on the mobile object on a basis of the recognized surrounding situation, resulting in a set risk area;

generating, by the computer, a target trajectory indicating a route along which the mobile object is to travel in the future on a basis of the set risk area, resulting in a generated target trajectory;

causing, by the computer, the mobile object to travel along the generated target trajectory; and setting, by the computer, different types of recognized targets as the set risk area in accordance with the plurality of distance-specific areas.

10. A non-transitory storage medium storing a program for causing a computer to:

recognize a surrounding situation of a mobile object, resulting in a recognized surrounding situation, set a recognized target as a risk area to be avoided in a traveling process of the mobile object in a plurality of distance-specific areas centered on the mobile object on a basis of the recognized surrounding situation, resulting in a set risk area, generate a target trajectory indicating a route along which the mobile object is to travel in the future on a basis of the set risk area, resulting in a generated target trajectory, and cause the mobile object to travel along the generated target trajectory, and set different types of recognized targets as the set risk area in accordance with the plurality of distance-specific areas.

* * * * *